(12) United States Patent
Ji et al.

(10) Patent No.: US 7,722,979 B2
(45) Date of Patent: May 25, 2010

(54) FUEL CELLS WITH HYDROPHOBIC DIFFUSION MEDIUM

(75) Inventors: Chunxin Ji, Pennfield, NY (US); Vinod Kumar, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1244 days.

(21) Appl. No.: 11/250,197

(22) Filed: Oct. 14, 2005

(65) Prior Publication Data

US 2007/0087260 A1    Apr. 19, 2007

(51) Int. Cl.
*H01M 4/94* (2006.01)
*H01M 4/96* (2006.01)
*B05D 5/12* (2006.01)
*H01M 4/88* (2006.01)

(52) U.S. Cl. .......................... 429/42; 429/44; 427/115; 502/101

(58) Field of Classification Search ................... 429/44, 429/42, 12, 13
See application file for complete search history.

(56) References Cited

U.S. PATENT DOCUMENTS

| | | | |
|---|---|---|---|
| 3,523,408 A * | 8/1970 | Rosenberg | 96/6 |
| 6,045,877 A | 4/2000 | Gleason et al. | |
| 6,365,293 B1 * | 4/2002 | Isono et al. | 429/30 |
| 6,368,751 B1 * | 4/2002 | Yao et al. | 429/235 |
| 6,928,893 B2 * | 8/2005 | Roth | 73/866 |
| 2003/0008200 A1 * | 1/2003 | Ito et al. | 429/44 |
| 2003/0138645 A1 | 7/2003 | Gleason et al. | |
| 2005/0181694 A1 * | 8/2005 | Crook et al. | 442/270 |

* cited by examiner

*Primary Examiner*—Dah-Wei D Yuan
*Assistant Examiner*—Amanda Barrow
(74) *Attorney, Agent, or Firm*—Harness, Dickey & Pierce, P.L.C.

(57) ABSTRACT

Diffusion media for use in PEM fuel cells are provided with silicone coatings. The media are made of a porous electro-conductive substrate, a first hydrophobic fluorocarbon polymer coating adhered to the substrate, and a second coating comprising a hydrophobic silicone polymer adhered to the substrate. The substrate is preferably a carbon fiber paper, the hydrophobic fluorocarbon polymer is PTFE or similar polymer, and the silicone is moisture curable.

6 Claims, 2 Drawing Sheets

FUEL CELLS WITH HYDROPHOBIC DIFFUSION MEDIUM

FIELD OF THE INVENTION

This invention relates to fuel cells with hydrophobic diffusion medium. In particular, the invention relates to fuel cell diffusion media having hydrophobic silicone coatings.

BACKGROUND OF THE INVENTION

Fuel cells are increasingly being used as a power source for electric vehicles and other applications. An exemplary fuel cell has a membrane electrode assembly (MEA) with catalytic electrodes and a proton exchange membrane (PEM) formed between the electrodes. Gas diffusion media play an important role in PEM fuel cells. Generally disposed between catalytic electrodes and flow field channels in the fuel cell, they provide reactant and product permeability, electronic conductivity, and heat conductivity, as well as mechanical strength needed for proper functioning of the fuel cell.

During operation of the fuel cell, water is generated at the cathode based on electrochemical reactions involving hydrogen and oxygen occurring within the MEA. Efficient operation of a fuel cell depends on the ability to provide effective water management in the system. For example, the diffusion media prevent the electrodes from flooding (i.e., filling with water and severely restricting $O_2$ access) by removing product water away from the catalyst layer while maintaining reactant gas flow from the bipolar plate through to the catalyst layer.

The gas diffusion media are generally constructed of carbon fiber containing materials. Although carbon fibers are themselves relatively hydrophobic, it is usually desirable to increase the hydrophobicity or to at least treat the carbon fiber with a more stable hydrophobic coating. Adding a hydrophobic agent such as polytetrafluoroethylene (FTFE) to the carbon fiber diffusion media is a common process for increasing the hydrophobicity. This process is normally done by dipping carbon fiber papers into a solution that contains PTFE particles and other wetting agents, such as non-ionic surfactants.

Fuel cell stacks can contain a large number of fuel cells depending on the power requirement of the application. For example, typical fuel stacks have up to 200 individual fuel cells and more. Because the fuel cells in the stacks operate in series, a weakness or poor performance in one cell can translate into poor performance of the entire stack. For this reason, it is desirable for every fuel cell in the stack to operate at high efficiency.

Because typical fuel stacks contain so many individual fuel cells, it has been observed that, even with a high degree of reliability of manufacture of diffusion media, it is sometimes observed that an individual or several diffusion media will have less than optimum performance, especially at a high relative humidity. When that occurs, a fuel stack containing such a fuel cell will generally exhibit less than optimum performance. Thus, diffusion media with enhanced hydrophobic properties and methods for producing them that lead to consistent results among hundreds of fuel cells in a single fuel stack would be an advance in the art.

SUMMARY OF THE INVENTION

In one aspect of the invention, silicone coatings are provided on diffusion media for use in fuel cells, such as PEM fuel cells. The diffusion media are made of a porous conductive substrate, a first hydrophobic fluorocarbon polymer coating adhered to the substrate, and a second coating comprising a hydrophobic silicone polymer adhered to the substrate. In various embodiments, the porous conductive substrate is a carbon fiber paper or other conductive substrate commonly used in a PEM fuel cell, and the hydrophobic fluorocarbon polymer is a hydrophobic polymer such as polytetrafluoroethylene (PTFE).

In various embodiments, the second coating is applied to a conductive substrate on which the first coating has already been applied; the first coating adheres to a substrate over a major part of the surface area of the substrate, and the second coating (the silicone polymer) adheres to an area or areas of the substrate that are not completely covered by the first coating. The second coating is preferably applied by contacting the substrate containing the first coating with a silicone composition. Preferably, the silicone composition contains components that cure to form the hydrophobic silicone polymer adhering to the substrate. In a preferred embodiment, the silicone polymer system is curable by the action of moisture and typically at room temperature.

Performance of PEM fuel stacks containing up to 200 or more individual fuel cells containing such diffusion media is improved and found to be more reliable, by virtue of the improved hydrophobic nature of the individual diffusion media in the stack. Accordingly, methods are provided for making the diffusion media and for improving the performance of fuel cell stacks containing individual fuel cells containing the media. The methods involve contacting a conductive porous substrate on which a hydrophobic fluorocarbon polymer is adhering with a silicone composition comprising, in a preferred embodiment, a moisture curable silicone resin.

In various embodiments, fuel cell stacks are assembled wherein each fuel individual fuel cell of the stack contains a diffusion medium coated with a hydrophobic silicone as described. In some embodiments, operation of a fuel cell stack is improved by first identifying any individual fuel cell that is performing poorly by virtue of having a diffusion medium that is too hydrophilic, and treating that diffusion medium of that fuel cell with the silicone composition as described.

DETAILED DESCRIPTION OF EMBODIMENTS OF THE INVENTION

Figure 1:
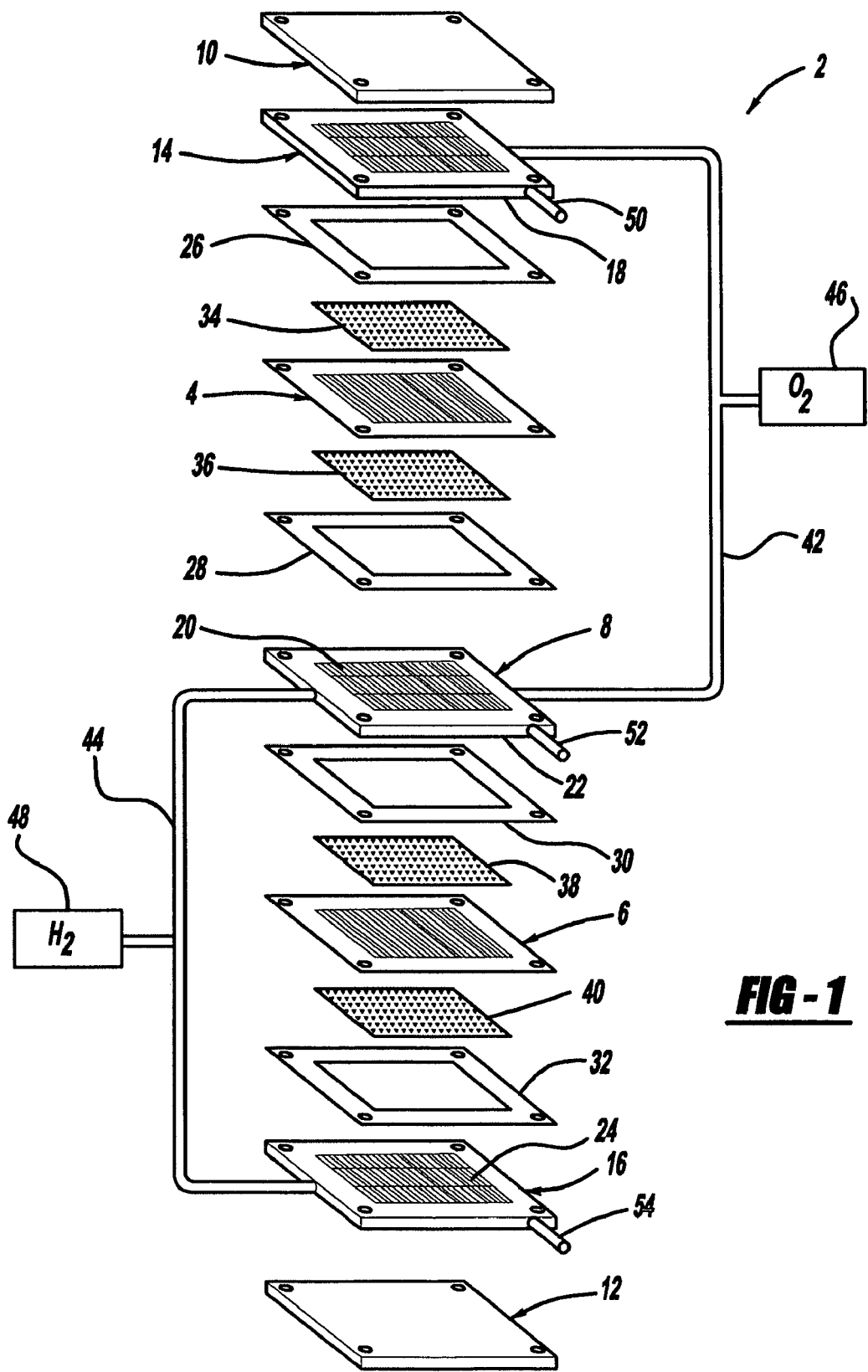
FIG. 1 is a schematic diagram of a fuel cell stack

In one embodiment, a diffusion medium suitable for use in a PEM fuel cell is made of a porous conductive (i.e., electroconductive) substrate having a first coating comprising a hydrophobic fluorocarbon polymer adhered to substrate. A second coating comprising a hydrophobic silicone polymer is also adhered to the substrate. In various embodiments, the substrate comprises a carbon fiber based diffusion medium, such as a carbon fiber paper. In typical embodiments, the hydrophobic fluorocarbon polymer is a hydrophobic material such as polytetrafluoroethylene (PTFE).

In another embodiment, a method for making a fuel cell diffusion medium for use in a PEM fuel cell comprises first coating a porous conductive substrate with a hydrophobic fluorocarbon polymer. After the substrate is coated with the hydrophobic fluorocarbon polymer, the fluorocarbon polymer coated substrate is then contacted with a silicone composition comprising a moisture curable silicone resin. In various embodiments, the hydrophobic fluorocarbon polymer is applied to a loading of 1 to 20% by weight based on the total weight of the substrate, and the silicone is applied from about 0.01 to about 5%, preferably from about 0.1 to 2% by weight, based on the total weight of the coated substrate. The method can further be applied to diffusion media that contain a microporous layer coating on one side of the conductive substrate. The microporous layer contains a fluorocarbon polymer and conductive particles, and generally has pore sizes much smaller than the pore sizes on the side of the substrate not coated with the microporous layer.

In another embodiment, fuel cells are provided that contain hydrophobic diffusion media as described herein. In a further embodiment, fuel cell stacks are provided that contains a plurality of the fuel cells.

In another embodiment, a method is provided for improving the high humidity performance of a PEM fuel cell stack. The stack contains a plurality of PEM fuel cells, each of the fuel cells containing a cathode, an anode, and a polyelectrolyte membrane disposed between the cathode and the anode, and further containing flow fields adjacent the electrodes (i.e., the anode and cathode). A fluoropolymer-coated diffusion medium is disposed between at least one of the electrodes and its flow field, that is, at least one of cathode and the cathode flow field and the anode and the anode flow field. That is to say, the individual fuel cells contain a diffusion medium on the cathode side and/or the anode side. The method involves contacting the fluoropolymer coated diffusion medium with a silicone composition that contains a moisture curable silicone resin. In various embodiments, the method results in the application of a hydrophobic silicone coating on areas of the fluorocarbon polymer coated diffusion medium that for one reason or another, including random or unpredicted variations in fluorocarbon coating processes, contain areas not completely coated with fluorocarbon polymer, which areas are therefore more hydrophilic than the rest of the diffusion medium.

In various embodiments, the method is carried out by operating a fuel cell stack and identifying any individual cells in the stack that are not performing as expected. In some embodiments, the fuel cell performing poorly is removed from the stack and the diffusion medium treated as described with a silicone coating. Thereafter the fuel cell stack is reassembled.

Fuel cell stacks contain a plurality of fuel cells, the number of individual cells depending on the power and voltage requirements of the application. In automotive use, typical fuel cell stacks contain 50 or more individual fuel cells and can contain up to 400, 500, or even more. Power requirements in various applications can also be met by providing a number of modules comprising individual fuel cell stacks. The modules are designed to work in a series to provide adequate power and are sized to fit within the available packaging.

FIG. 1 is an expanded view showing some details of the construction of a typical multi-cell stack, showing just two cells for clarity. The bipolar fuel cell stack 2 has a pair of membrane electrode assemblies (MEA) 4 and 6 separated from each other by an electrically conductive fuel distribution element 8, hereinafter bipolar plate 8. The MEA's 4 and 6 and bipolar plate 8 are stacked together between stainless steel clamping plates or end plates 10 and 12 and end contact elements 14 and 16. The end contact elements 14 and 16, as well as both working faces of the bipolar plate 8, contain a flow field of a plurality of grooves or channels 18, 20, 22, and 24 respectively, for distributing fuel and oxidant gases (i.e. hydrogen and oxygen) to the MEA's 4 and 6. Non-conductive gaskets 26, 28, 30, and 32 provide seals and electrical insulation between several components of the fuel cell stack. Gas permeable conductive materials used as gas diffusion media are typically carbon/graphite diffusion papers 34, 36, 38, and 40 that press up against the electrode faces of the MEA's 4 and 6. The end contact elements 14 and 16 press up against the carbon graphite diffusion media 34 and 40 respectively, while the bipolar plate 8 presses up against the diffusion medium 36 on the anode face of MEA 4, and against carbon graphite diffusion medium 38 on the cathode face of MEA 6. Oxygen is supplied to the cathode side of the fuel cell stack from storage tank 46 by appropriate supply plumbing 42, while hydrogen is supplied to the anode side of the fuel cell from storage tank 48, by appropriate supply plumbing 44. Alternatively, ambient air may be supplied to the cathode side as an oxygen source and hydrogen may be supplied to the anode from a methanol or gasoline reformer. Exhaust plumbing (not shown) for both the hydrogen and oxygen sides of the MEA's 4 and 6 will also be provided. Additional plumbing 50, 52, and 54 is provided for supplying liquid coolant to the bipolar plate 8 and end plates 14 and 16. Appropriate plumbing for exhausting coolant from the coolant bipolar plate 8 and end plate 14 and 16 is also provided, but not shown.

Individual fuel cells contain a proton exchange membrane disposed between electrodes. The electrodes are an anode and a cathode for use in carrying out the overall production of water from fuel containing hydrogen and an oxidant gas containing oxygen. In various embodiments, the electrodes contain carbon support particles on which smaller catalyst particles (such as platinum) are disposed, the carbon and catalyst supported generally on a porous and electroconductive material such as carbon cloth or carbon paper. Suitable electrodes are commercially available; in some embodiments, the anode and cathode are made up of the same material.

The electrically conductive porous material or substrate for use as the diffusion media in the invention is in general a porous planar flexible material that may be wetted by water or other solvents associated with solutions of polymers as described below. In various embodiments, the porous material (also called a sheet material) is made of a woven or non-woven fabric or paper.

In a preferred embodiment, the sheet material is made of a carbon fiber substrate such as carbon fiber paper. Carbon fiber-based papers may be made by a process beginning with a continuous filament fiber of a suitable organic polymer. After a period of stabilization, the continuous filament is carbonized at a temperature of about 1200° C.-1350° C. The continuous filaments can be woven into carbon cloth or chopped to provide shorter staple carbon fibers for making carbon fiber paper. These chopped carbon fibers are made into carbon fiber paper sheets or continuous rolls through various paper making processes. Thereafter, in an illustrative embodiment, the carbon fiber papers are impregnated with an organic resin and molded into sheets or rolls. The woven carbon cloth and the molded carbon paper sheets or rolls are then carbonized or graphitized at temperatures above 1700° C. Suitable carbon fiber-based substrates are described, for example in Chapter 46 of Volume 3 of Fuel Cell Technology and Applications, John Wiley & Sons, (2003), the disclosure of which is helpful for background and is incorporated by reference. In various embodiments, the substrates take the form of carbon fiber paper, wet laid filled paper, carbon cloth, and dry laid filled paper.

Carbon fiber papers may be thought of as a non-woven fabric made of carbon fibers. Carbon fiber paper is commercially available in a variety of forms. In various embodiments, for example, the density of the paper is from about 0.3 to 0.8 g/cm$^3$ or from about 0.4 to 0.6 g/cm$^3$, and the thickness of the paper is from about 100 μm to about 1000 μm, preferably from about 100 μm to about 500 μm. Typical porosities of commercially available papers are from about 60% to about 80%. Suitable carbon fiber papers for use in fuel cell applications as described herein are available for example from Toray Industries USA. An example of commercially available carbon fiber paper from Toray is TGPH-060, which has a bulk density of 0.45 gm/cm$^3$ and is approximately 180 microns (micrometers) thick.

In one aspect, the hydrophobic fluorocarbon polymer is one that will settle out of an emulsion or precipitate out of a solution under the evaporating conditions described below. Preferably, the polymer deposited onto the sheet material is one that will remain stably in contact with the portions of the sheet during conditions of its use in the eventual end application, such as a diffusion medium in a fuel cell. The compatibility or stability of the polymer in contact with the substrate may be enhanced by certain post-curing steps where the coated sheet material is heated to a high temperature (e.g., 380° C. for PTFE) to fix the structure of the polymer on the sheet material.

The fluorocarbon polymer generally imparts a hydrophobic character to the substrate sheet material where the polymer is deposited. By convention, the polymer is considered to render the surface of the substrate hydrophobic if the surface free energy of the polymer material is less than the surface free energy of the sheet material itself. Surface free energy of the polymer and the sheet material may be measured by and correlated to the contact angle of water in contact with the polymer or sheet material, respectively. For example, if the contact angle of water on the polymer is greater than the contact angle of water on the sheet material, then the polymer may be considered a hydrophobic material. If the contact angle of water on the polymer is less than the contact angle of water on the sheet material, the polymer may be considered as a hydrophilic polymer.

Suitable fluorocarbon polymers include fluorine-containing polymers, made by polymerizing or copolymerizing one or more monomers that contain at least one fluorine atom. Non-limiting examples of fluorine-containing monomers that may be polymerized to yield suitable fluorocarbon polymers include tetrafluoroethylene, hexafluoropropylene, vinylidene fluoride, perfluoromethyl vinyl ether, perfluoropropyl vinyl ether, and the like. The presence of fluorine-carbon bonds is believed to be responsible for the hydrophobic nature of these polymers.

A preferred fluorocarbon polymer is polytetrafluoroethylene (PTFE). PTFE is preferred in some embodiments because of its wide availability and relatively low cost. Other fluorine-containing polymers may also be used. Suitable fluorocarbon polymers include without limitation PTFE; FEP (copolymers of hexafluoropropylene and tetrafluoroethylene); PFA (copolymers of tetrafluoroethylene and perfluoropropylvinylether); MFA (copolymers of tetrafluoroethylene and perfluoromethylvinylether); PCTFE (homopolymers of chlorotrifluoroethylene); PVDF (homopolymers of vinylidene fluoride); PVF (polymers of vinylfluoride); ETFE (copolymers of ethylene and tetrafluoroethylene); and THV (copolymers of vinylidene fluoride, hexafluoropropylene, and tetrafluoroethylene). Aqueous dispersions of these and other fluorocarbons are commercially available, for example from DuPont. The dispersions may be conveniently prepared by emulsion polymerization of fluorine-containing monomers and other monomers to form the polymers. Alternatively, the dispersions may be made by combining polymer powder, solvent, and surfactants. The polymer dispersion may comprise from 1-90% by weight of the fluorocarbon polymer with the balance comprising water and surfactant. For example, DuPont T30 PTFE product is available containing 60% by weight PTFE particles.

In a non-limiting procedure, the fluorocarbon polymers are applied to the porous electroconductive substrate by wetting the substrate in a wetting composition including the polymer and a liquid. The liquid is also referred to as a "solvent". In some embodiments, the wetting composition is provided in the form of an emulsion. Solutions may also be used. In some embodiments, the wetting compositions contain surface-active materials or other agents to hold the polymer in solution or suspension, and/or to aid in wetting the substrate. For example, an emulsion used to wet the sheet material may include from 1 to about 70% by weight particles of a hydrophobic polymer such as polytetrafluoroethylene. In various embodiments, ranges of 1% to 20% are preferred. In a preferred embodiment, the polymer composition contains approximately 2% to 15% of the polymer solids by weight.

The liquid is preferably aqueous (water or water mixture), and may further comprise organic liquids. Generally, non-ionic surfactants are used as wetting agents, with the result that no metal ions will be left in the carbon fiber diffusion media after the wetting agents are decomposed during high temperature treatment. Non-limiting examples of surfactants include nonylphenol ethoxylates, such as the Triton series of Rohm and Haas, and perfluorosurfactants.

In a preferred embodiment, a substrate is prepared by applying the fluorocarbon polymer composition to at least one surface of the substrate. The polymer composition may be applied to both sides of the substrate by immersing the porous substrate (e.g., a carbon fiber paper or cloth) into a fluorocarbon dispersion, by spraying both sides of the sheet-like substrate, or by other suitable means. In a typical procedure, the substrate is dipped into the fluorocarbon dispersion and removed after a time of soak. In other embodiments, the polymer composition may be applied to only one surface of the substrate, for example, by spraying, vapor deposition, and the like. Exposure of the substrate to the fluorocarbon polymer dispersion occurs for a time sufficient to provide the substrate with the proper amount of fluoropolymer. A wide range of loadings of PTFE or other fluorocarbon may be applied to the carbon fiber substrate. In some embodiments, it is desirable to incorporate about 2 to 30% fluorocarbon polymer by weight of the diffusion medium, measured after the drying and other steps noted below. In other embodiments, at least 5% by weight polymer is incorporated into the diffusion medium. Typically the substrates may be dipped or immersed in the fluorocarbon dispersion for a few minutes to obtain an appropriate loading of fluorocarbon on the substrate. In various embodiments, the dispersion contains from 1% to 50% by weight of fluorocarbon particles. Dispersions having concentrations of particles in the preferred range may be made by diluting commercial sources of the dispersions as necessary to achieve the desired concentrations. In a non-limiting example, a dispersion containing 60 weight percent (%) PTFE may be diluted 20 times with de-ionized water to produce a dispersion containing 3% by weight PTFE particles.

The time of exposing the substrate to the fluorocarbon polymer dispersion is long enough for resin particles to imbibe into the pores of the carbon fiber paper or cloth, yet short enough to be an economically viable process. Generally, the time of soaking and the concentration of the fluorocarbon polymer particles, as well as the nature of the resin, may be varied and optimized to achieve desired results.

After applying the fluorocarbon polymer composition to at least one surface of the substrate, it is preferred to remove excess solution before further processing. In one embodiment, the substrate may be removed from the liquid dispersion and the excess solution allowed to drip off. Other processes are possible, such as rolling, shaking, and other physical operations to remove excess solution.

The diffusion medium is preferably then dried by removing the solvent. Removal of the solvent may be achieved by a variety of methods, such as convective heat drying or infrared drying.

In addition to the hydrophobic fluorocarbon polymer coating discussed above, the invention provides in various embodiments for application of a further surface layer or layers. The most common is referred to as a microporous layer, conductive particles mixed with a polymeric binder. In various embodiments, the microporous layer is applied as a paste to the substrate, and may be applied before or after the hydrophobic fluorocarbon polymer coating, or it may be applied to a surface or side of the medium not covered by the fluorocarbon polymer. As noted, the paste contains conductive particles and preferably particles of a polymeric binder. Non-limiting examples of conductive particles include carbon particles such as, without limitation, carbon black, graphite particles, ground carbon fibers, and acetylene black. The polymeric binder is preferably made of a fluorocarbon polymer or fluororesin such as discussed above with respect to the first coating on the substrate. In this regard a preferred fluorocarbon polymer for making the paste is PTFE. In various embodiments, the paste is applied to the substrate to form the microporous layer by conventional techniques, such as doctor blading, screen printing, spraying, and rod coating.

In practice, the paste is made from a major amount of solvents and a relatively lesser amount of solids. The viscosity of the paste can be varied by adjusting the level of solids. The solids contain both the carbon particles and the fluorocarbon polymer particles in a ratio by weight of from about 9:1 to about 1:9. Preferably, the weight ratio of carbon particles to fluorocarbon polymer is from about 3:1 to about 1:3. The fluorocarbon particles are conveniently supplied as a dispersion in water. An exemplary paste composition contains 2.4 grams acetylene black, 31.5 mL isopropanol, 37 mL deionized water, and 1.33 g of a 60% by weight dispersion of PTFE in water. This paste has a weight ratio of acetylene black to fluorocarbon polymer, on a dry basis, of about 3:1.

The paste is applied onto the dried porous substrate to provide a microporous layer that extends from the surface into the interior of the paper. In various embodiments, the microporous layer is about 5 to about 20% of the thickness of the paper. For example, with a typical paper 200 microns thick, the microporous layer is from about 10 to about 30 microns thick above the surface of the paper. Penetration of the microporous layer into the bulk of the paper can range up to about 100 μm, and depends on the viscosity of the paste. The amount of paste to apply to a paper can be determined from the density of the solids, the area of the paper, and the thickness of microporous layer desired. In various embodiments, a paste is applied to a paper at an areal loading of about 1.0 to about 2.5 mg/cm$^2$, based on the weight of the solids in the paste.

The microporous layer preferably has a pore size of the carbon agglomerates, i.e., between about 100 and about 500 nm, as compared with 10 to 30 microns pore size for carbon fiber paper substrates. The microporous layer provides effective removal of liquid water from the cathode catalyst layer into the diffusion media. For this reason, the diffusion medium is preferably installed in the fuel cells with the microporous layer side toward the cathode. The microporous layer also aides in reducing electrical contact resistance with the adjacent catalyst layer. The properties of the microporous layer can be varied by adjusting the hydrophobicity of the polymeric binder and the particle and agglomerate structure of the conductive particles.

After optional application of the microporous layer, the substrate is preferably sintered by heating at a temperature high enough to melt the particles of polymeric binder and coalesce the microporous layer. In the case of PTFE containing microporous layers, a temperature of 380° C. has been found to sufficient.

After the first coating that comprises a hydrophobic polymer is applied and adhered to the substrate, a second coating comprising a hydrophobic silicone polymer is adhered to the substrate. Any first coating and/or microporous layer is to be sintered prior to applying the second (silicone) coating.

The second coating results in a hydrophobic silicone layer being applied to the substrate. A hydrophobic silicone layer is one that gives a contact angle of water of greater than 90°. Although the invention is not limited by theory, it is believed that the second coating and the resulting hydrophobic silicone coating sticks or adheres to portions of the substrate that are not adequately covered by PTFE or other fluorocarbon polymers. Without the silicone coating, these areas of the substrate would remain more hydrophilic than the other coated areas and become more hydrophilic over time during fuel cell operation. It is believed that such hydrophilic areas, which result from incomplete coverage of the substrate by the fluorocarbon polymer, lead to poor performance, especially at high humidity, of cells that contain such coated substrates as diffusion media. One reason for this may be that the hydrophilic areas on the incompletely covered substrate tend to retain water rather than repel water. In addition, heterogeneous surface properties of the gas diffusion media facing the flow channels makes it more difficult to remove water slugs in the gas flow channels, which can result in uneven gas flow distributions among different cells. As a result, water tends to accumulate and inhibit the electrochemical reactions of certain cells, which results in so-called low performing cells. By covering any such small hydrophilic areas on the fluorocarbon coated substrate with additional hydrophobic polymer, such as the second hydrophobic silicone polymer coating, the diffusion medium is rendered more homogeneously hydrophobic. As a result, the performance of fuel cells containing the substrates, especially at high relative humidity, is improved.

In various embodiments, the second coating is adhered to the substrate by contacting the diffusion medium with a silicone composition that contains a curable silicone resin, preferably one that is curable by the action of moisture. In various embodiments, the silicone composition is applied to the substrate by dipping, spraying, or other means. Conveniently, the silicon composition contains a solvent in addition to the silicone resin components. If the silicone resin is moisture curable, it is preferred to use a solvent other than water. Preferably the solvent is one that does not interfere with the cure of the silicone or with the application of the silicone coating onto the substrate. Methylene dichloride has been found to be a suitable solvent.

In a preferred embodiment, the curable silicone resin is one in which the cure is activated by contact with moisture. In various embodiments, the curable silicone resin contains a silicone prepolymer and a crosslinker. The prepolymer and the crosslinker contain functional groups that react with one another preferably activated by the presence of water or moisture, to form a crosslinked or cured silicone polymer. The resulting polymer, formed on the surface of the substrate, and preferably on areas of the substrate not adequately coated by the fluorocarbon polymer, is hydrophobic and acts to repel water and prevent accumulation on the cathode of the fuel cell. As a result, performance of the fuel cell, especially at high relative humidity, is enhanced.

Advantageously, after application of a moisture curable silicone resin as described above, curing occurs upon exposure to moisture in air, and can further continue after assembly into the fuel cell and fuel cell stack during operation of the fuel cell stack that produces water.

Illustrative silicone prepolymers include those that are represented by the following structure

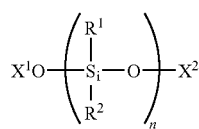

(1)

In the structure $R^1$ and $R^2$ are the same or different and independently represent aliphatic or aromatic groups. In various embodiments, the aliphatic or aromatic groups $R^1$ and $R^2$ comprise alkyl, aryl, perfluoroalkyl, and perfluoroaryl, preferably having from 1 to 20 carbons. In an embodiment, $R^1$ and $R^2$ independently contain from 1 to 6 carbons. The aliphatic and aromatic groups $R^1$ and $R^2$ can contain ether linkages, as long as the resulting polymer upon cure is hydrophobic enough to enhance performance of a fuel cell containing a coated diffusion medium. For example, the $R^1$ and $R^2$ groups can independently comprise polyethers such as polypropylene oxides and polyperfluoroolefin ethers. The groups $X^1$ and $X^2$ are chemical moieties that provide the silicone prepolymer with the ability to react with complementary functional groups on the crosslinker to form the cured hydrophobic polymer on the surface of the substrate. Preferred $X^1$ and $X^2$ groups include hydrogen and lower alkyl having 1 to 6 carbons. The silicone prepolymer has a molecular weight determined by the value of n, which represents the average number of repeating siloxane units in the prepolymer. Generally, n is greater than 2 and is typically about 200-1500 for room temperature vulcanized materials and 3000-11000 for heat cured materials. Typical values of n range from about 10 to about 1000.

In various embodiments, the crosslinker has a structure defined by the following $$SiY_m R^3_{4-m}$$ (2)

where the $R^3$ are independently a group that does not participate in the crosslinking. Non-limiting examples include aliphatic and aromatic groups such as discussed above for the prepolymer. In preferred embodiments, $R^3$ is selected from among $C_{1-6}$ alkyl, and $C_{6-10}$ aryl groups. Preferred $R^3$ groups include methyl and hydrogen. Y is a functional group that is reactive with the $X^1O$ and $X^2O$ groups of the prepolymer to form covalent bonds to crosslink and cure the resin. Preferred functional groups for element to Y includes hydroxyl and alkoxy, especially alkoxy of 1 to 6 carbon atoms. In a preferred embodiment, the Y group is methoxy or ethoxy. In the crosslinker, m is greater than 1 and is preferably 2 or greater. In a preferred embodiment, m is greater than 2 and preferably less than 4.

Preferably, the groups $X^1$ and $X^2$ and Y are such that crosslinking is enhanced by the action of water. For example, when $X^1$ and $X^2$ are hydrogen or alkoxy and Y is hydroxyl or alkoxy, reaction of water acts to enhance the crosslinking reaction.

The silicone resins optionally further comprise suitable additives such as fillers, other auxiliaries, chain transfer agents for controlling polymerization, and the like. Suitable silicone resins are commercially available. Non-limiting examples include Dow Corning 3140 adhesive. The hydrophobic silicone coating is applied by contacting the substrate with a silicone composition as described above. A variety of methods can be used to carry out the contact such as dipping, spraying, rolling, doctor blading, and the like. In a non-limiting example, the substrate is dipped into a dilute solution of the curable silicone resin. The dilution of the resin and the method of application are chosen so as to apply sufficient silicone polymer to make the resulting diffusion medium hydrophobic and improve cell performance, especially at high relative humidity. It has been found acceptable to add about 1% of silicone polymer, based on the total weight of the diffusion medium.

In various embodiments, the methods described above can be used to carry out a kind of repair on a fuel cell stack where certain cells in the stack are exhibiting low performance at high relative humidity operation conditions and/or low current operation conditions (e.g. much lower gas flow rate and thus hard to remove water slugs in the gas flow channels). As discussed, such fuel cell stacks normally contain a large number of individual fuel cells depending on the power required. Typically fuel cell stacks contain 20 to 500 cells, 50 to 500 cells, 100 to 400 cells, or 200 to 400 cells. Because the cells are installed in series, any low performing individual cell will affect the performance of the fuel stack. In one embodiment, the methods above can be used to repair or remediate an individual fuel cell operating in such a fuel stack. In this method, the low performing cell in the stack is identified and the diffusion medium of the cell is treated by contacting it with a curable silicone resin. Upon reassembly of the fuel cell and the fuel cell stack, it is observed that the high humidity performance of the cell and low current stability is improved.

Instead of, or in addition to fuel cell remediation as discussed above, the methods of the invention can be applied prophylactically to make hydrophobic diffusion media that work more reliably, especially when combined into fuel stacks containing 50, 100, 200, or more individual fuel cells.

Diffusion media prepared by coating with fluorocarbon polymers tend also to gradually lose hydrophobicity over time during stack operation. For example, over time, dark lines can be observed forming on such carbon fiber diffusion media. The dark lines represent areas less hydrophobic than the freshly coated sample. Accordingly, water tends to accumulate at those areas of the diffusion medium. In various embodiments, treating fluorocarbon polymer coated diffusion media with hydrophobic silicone resin as described herein mitigates this loss of hydrophobicity over time of stack operation. Such resistance to aging can be observed, for example in laboratory ex situ aging tests. In such aging tests, coated diffusion media are exposed to 15% hydrogen peroxide solution at 65° C. for extended periods of time, for example 7 or 10 days. Wilhelmy measurements of advancing and receding contact angles indicate response of the substrate to aging. In the case of substrate dipped in silicone resin to apply the second hydrophobic silicone coating, the contact angles tend to remain constant or even go up slightly upon aging, reflecting good retention of hydrophobicity upon accelerated aging.

The invention described above with respect to various embodiments. Further non-limiting descriptions are given in the working Examples that follow.

EXAMPLES

Example 1

Preparation of Fluorocarbon Polymer Coated Diffusion Medium

A fluoropolymer solution is prepared by diluting one part DuPont T30 solution into 19 parts deionized water by volume. T30 is a commercial product and is a dispersion of 60% by weight PTFE, water, and surfactant. The diluted solution is stirred for about 5 minutes. Toray carbon paper (TGPH 060 or TGPH 090) is immersed into the fluoropolymer solution for a time period of about 3 minutes up to about 5 minutes. The paper is then removed form the solution and allowed to drip dry for about 1 minute. After drip dry, the excess solvent is removed from the paper by placing the paper in a 90° C. oven until dry. The temperature is then ramped up to 290° C. and then 380° C. in the oven and held at the respective temperatures for 30 minutes. The resulting diffusion medium contains a hydrophobic fluorocarbon polymer adhered to the substrate. The polymer coating on the substrate is sintered.

A number of carbon fiber substrates are fluorocarbon coated as described in the preceding paragraphs. Although most of the papers prepared in such a fashion exhibit suitable performance at high relative humidity, an individual coated substrate having low performance is identified and further tested below.

Example 2

The gas diffusion medium with low performance (poor water management capability) identified in Example 1 is treated with a silicone coating by dipping it into a dichloromethane solution containing 2 g/liter Dow Corning 3140 adhesive. The substrate is then air dried and installed into a fuel cell.

Example 3

A low performing diffusion medium identified from Example 1 and a diffusion medium further treated with silicone as described in Example 2 are tested in fuel cells, with the results shown in FIG. 2. The figures show current versus voltage curves. The fuel cell is composed of a pair of serpentine graphite flow fields with 50 cm$^2$ active area. The MEA used in the test is Gore 5510 (25 microns thick) MEA. Three different operating conditions are tested: 1) cell temperature 70° C., anode is pure $H_2$, cathode is air, the gas outlet is pressure 100 KPa (absolute), and the inlet gas for the anode and cathode are under 40% relative humidity that results in 84% outlet relative humidity during operation; 2) cell temperature 80° C., anode is pure $H_2$, cathode is air, the gas outlet is pressure 150 KPa (absolute), and the inlet gas for the anode and cathode are under 66% relative humidity that results in 110% outlet relative humidity during operation; and 3) cell temperature 60° C., anode is pure $H_2$, cathode is air, the gas outlet is pressure 270 KPa (absolute), and the inlet gas for the anode and cathode are under 100% relative humidity that results in 300% outlet relative humidity during operation. At 84% outlet relative humidity, the current versus voltage curves for the diffusion media of Example 1 and Example 2 are nearly identical.

Figure 2A:
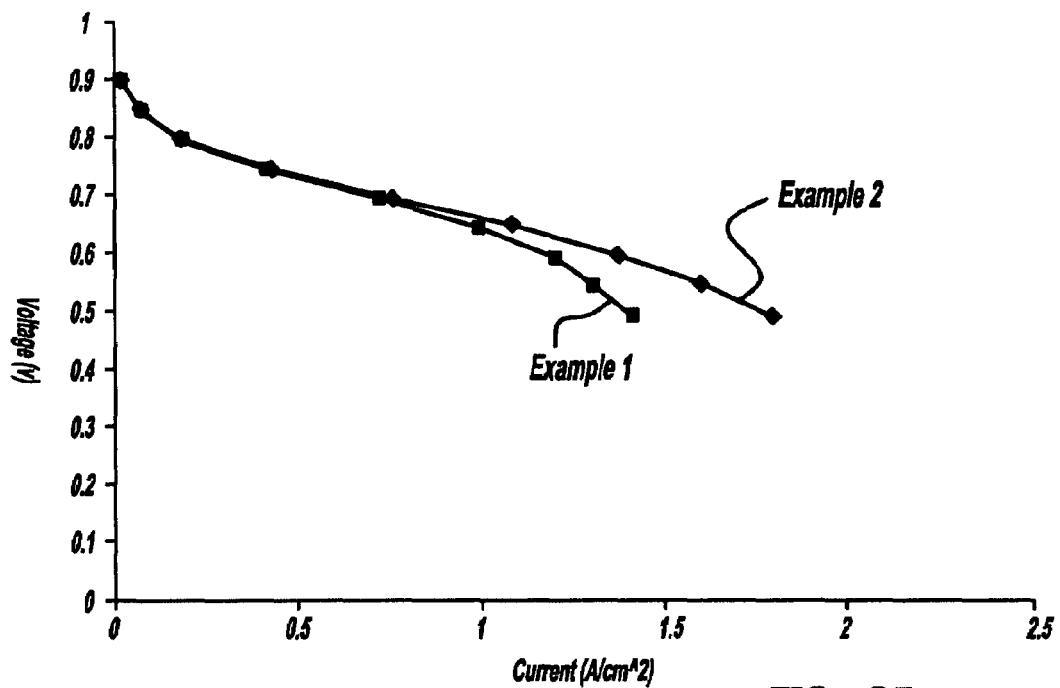
FIG. 2 shows current voltage curves of treated diffusion media.
Figure 2B:
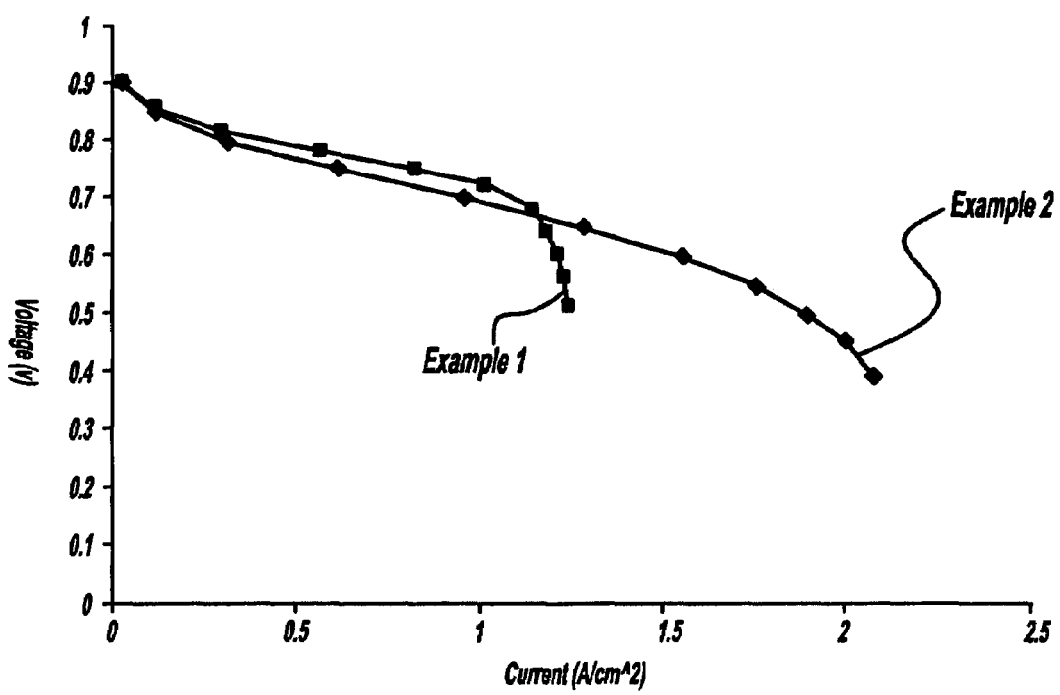

FIGS. 2a and 2b show, respectively, the voltage curves for comparative fuel cells run at 110% outlet relative humidity and 300% outlet relative humidity, respectively. The Figures show that the cell performance of fuel cells containing silicone coated diffusion media (Example 2) is superior to those having only the fluorocarbon polymer coating (Example 1).

The description of the invention is merely exemplary in nature and, thus, variations that do not depart from the gist of the invention are intended to be within the scope of the invention. Such variations are not to be regarded as a departure from the spirit and scope of the invention.

We claim:

1. A diffusion medium for use in a PEM fuel cell, comprising:
    a porous conductive substrate;
    a first coating comprising a hydrophobic fluorocarbon polymer adhered to the substrate; and
    a second coating comprising a silicone polymer adhered to the substrate wherein the first coating adheres to the substrate over a major part of the surface area of the substrate and the second coating adheres to an area of the substrate not covered by the first coating, wherein the diffusion medium has a first and second side, the first side comprising the first and second coating, the second side comprising a microporous layer, wherein the microporous layer comprises carbon and a sintered mass of fluorocarbon polymer particles.

2. A diffusion medium according to claim 1, wherein the substrate comprises carbon fiber paper.

3. A diffusion medium according to claim 1, wherein the hydrophobic fluorocarbon polymer comprises PTFE.

4. A diffusion medium according to claim 1, wherein the second coating comprises a moisture cured silicone.

5. A fuel stack comprising a plurality of fuel cells, wherein at least one of the fuel cells comprises a diffusion medium according to claim 1.

6. A diffusion medium according to claim 1, wherein the hydrophobic fluorocarbon polymer is applied to a loading of 1-20% by weight based on the total weight of the substrate, and the hydrophobic silicone is applied to a loading of 0.01 to 5% by weight based on the total weight of the coated substrate.

* * * * *